United States Patent
David et al.

(10) Patent No.: US 12,307,373 B2
(45) Date of Patent: May 20, 2025

(54) PARTIAL-ACTIVATION OF NEURAL NETWORK BASED ON HEAT-MAP OF NEURAL NETWORK ACTIVITY

(71) Applicant: Nano Dimension Technologies, Ltd., Ness Ziona (IL)

(72) Inventors: Eli David, Tel Aviv (IL); Eri Rubin, Tel Aviv (IL)

(73) Assignee: Nano Dimension Technologies, Ltd., Ness Ziona (IL)

( * ) Notice: Subject to any disclaimer, the term of this patent is extended or adjusted under 35 U.S.C. 154(b) by 1014 days.

(21) Appl. No.: 17/336,250

(22) Filed: Jun. 1, 2021

(65) Prior Publication Data

US 2021/0406692 A1 Dec. 30, 2021

Related U.S. Application Data

(63) Continuation of application No. 16/916,543, filed on Jun. 30, 2020, now Pat. No. 11,055,617.

(51) Int. Cl.
*G06N 3/082* (2023.01)
*G06F 18/211* (2023.01)
(Continued)

(52) U.S. Cl.
CPC .......... *G06N 3/082* (2013.01); *G06F 18/211* (2023.01); *G06N 3/045* (2023.01); *G06N 3/063* (2013.01);
(Continued)

(58) Field of Classification Search
CPC ........ G06N 3/082; G06N 3/084; G06N 5/046; G06N 3/045; G06N 3/08; G06N 3/063;
(Continued)

(56) References Cited

U.S. PATENT DOCUMENTS 7,814,038 B1  10/2010  Repici
10,339,450 B2  7/2019  David
(Continued)

FOREIGN PATENT DOCUMENTS

JP  1995319509  12/1995
JP  2020-8993  1/2020
(Continued)

OTHER PUBLICATIONS

Isanta Navarro, Roger. "Study of a neural network-based system for stability augmentation of an airplane." (2013). (Year: 2013).*
(Continued)

*Primary Examiner* — Michael W Ayers
*Assistant Examiner* — Nicholas S Wu
(74) *Attorney, Agent, or Firm* — PEARL COHEN ZEDEK LATZER BARATZ LLP

(57) ABSTRACT

A device, system, and method for training or prediction of a neural network. A current value may be stored for each of a plurality of synapses or filters in the neural network. A historical metric of activity may be independently determined for each individual or group of the synapses or filters during one or more past iterations. A plurality of partial activations of the neural network may be iteratively executed. Each partial-activation iteration may activate a subset of the plurality of synapses or filters in the neural network. Each individual or group of synapses or filters may be activated in a portion of a total number of iterations proportional to the historical metric of activity independently determined for that individual or group of synapses or filters. Training or prediction of the neural network may be performed based on the plurality of partial activations of the neural network.

30 Claims, 5 Drawing Sheets

(51) Int. Cl.
| | |
|---|---|
| *G06N 3/045* | (2023.01) |
| *G06N 3/063* | (2023.01) |
| *G06N 3/08* | (2023.01) |
| *G06N 3/084* | (2023.01) |
| *G06N 5/04* | (2023.01) |
| *G06N 5/046* | (2023.01) |
| *G06V 10/44* | (2022.01) |
| *G06V 10/82* | (2022.01) |

(52) U.S. Cl.
CPC ............... *G06N 3/08* (2013.01); *G06N 3/084* (2013.01); *G06N 5/04* (2013.01); *G06N 5/046* (2013.01); *G06V 10/454* (2022.01); *G06V 10/82* (2022.01)

(58) Field of Classification Search
CPC ...... G06N 5/04; G06F 18/211; G06V 10/454; G06V 10/82
See application file for complete search history.

(56) References Cited

U.S. PATENT DOCUMENTS

| | | | |
|---|---|---|---|
| 10,366,322 | B2 | 7/2019 | David et al. |
| 10,515,306 | B1 | 12/2019 | David et al. |
| 10,878,321 | B2 | 12/2020 | David et al. |
| 2016/0321540 | A1 | 11/2016 | Towal |
| 2018/0174023 | A1* | 6/2018 | Imam ................... G06N 3/063 |
| 2020/0209810 | A1* | 7/2020 | Bazhenov ............ G05B 13/026 |
| 2020/0265304 | A1* | 8/2020 | Nagaraj Chandrashekar .............. G06N 20/00 |
| 2021/0089841 | A1 | 3/2021 | Mithun et al. |
| 2021/0097132 | A1* | 4/2021 | Dimanov ............ G06F 18/2193 |

FOREIGN PATENT DOCUMENTS

| | | |
|---|---|---|
| KR | 1020210123402 A | 10/2021 |
| TW | 201706918 A | 2/2017 |
| TW | 201944283 A | 11/2019 |

OTHER PUBLICATIONS

Downing, Keith L. "Learning via Synaptic Tuning." (2015): 231-274. (Year: 2015).*
Friedrich, Johannes, and Máte Lengyel. "Goal-directed decision making with spiking neurons." Journal of Neuroscience 36.5 (2016) : 1529-1546. (Year: 2016).*
Demin, Vyacheslav, and Dmitry Nekhaev. "Recurrent spiking neural network learning based on a competitive maximization of neuronal activity." Frontiers in neuroinformatics 12 (2018): 79. (Year: 2018).*
Sun, Xiaoyu, et al. "Fully parallel RRAM synaptic array for implementing binary neural network with (+ 1,−1) weights and (+ 1, 0) neurons." 2018 23rd Asia and South Pacific Design Automation Conference (ASP-DAC). IEEE, 2018. (Year: 2018).*
Gomez, Aidan N., et al. "Learning sparse networks using targeted dropout." arXiv preprint arXiv:1905.13678 (2019). (Year: 2019).*
Rennie, Steven J., Vaibhava Goel, and Samuel Thomas. "Annealed dropout training of deep networks." 2014 IEEE Spoken Language Technology Workshop (SLT). IEEE, 2014. (Year: 2014).*
Office Action for Taiwan Application No. 110123505 dated Jun. 2, 2022.
Taiwan Search Report and Office Action for Appl. No. 110123505 dated Jun. 20, 2022.
Bellec Guillaume et al.: "Deep Rewiring: Training Very Sparse Deep Net-Works", Aug. 7, 2018 (Aug. 7, 2018), pp. 1-24,XP055832112, Retrieved from the Internet: URL:https://arxiv.org/pdf/1711.05136.pdf [retrievedonAug. 16, 2021].
Dai Xiaoliang et al:"NeST:A Neural Network Synthesis Tool Based on a Grow- and-Prune Paradigm", Ieeetransactionsoncomputers, IEEE,USA, vol. 68, No. 10, Oct. 1, 2019 (Oct. 1, 2019), pp. 1487-1497,XP011744527, ISSN:0018-9340, DOI:10.1109/TC.2019.2914438 [retrievedonSep. 6, 2019].
European Search Report for Pat. Appl. No. 21178886.4 dated Feb. 8, 2022.
Korean Office Action for Pat. Appl. No. 10-2021-0084754 dated Nov. 29, 2021.
Korean Notice of Allowance for Pat. Appl. No. 10-2021-0084754 dated Feb. 9, 2022.
Japanese Office action for Pat. Appl. No. 2021-102518 dated Oct. 26, 2021.
Navarro, Roger Isanta, "Study of a neural network-based system for stability augmentation of an airplane", Sep. 2013, Escola Tecnica Superior d'Enginyeries Industrial Aeronautica de Terrassa, Universitat Politecnica De Catalunya.
Sun et al., "Testing deep neural networks", Mar. 10, 2018, arXiv preprint arXiv:1803.04792.
Sun, Xiaoyu, Xiaochen Peng, Pai-Yu Chen, Rui Liu, Jae-sun Seo, and Shimeng Yu. "Fully parallel RRAM synaptic array for implementing binary neural network with(+ 1,− 1) weights and(+ 1, 0) neurons." In 2018 23rd Asia and South Pacific Design Automation Conference (ASP-DAC), pp. 574-579. IEEE, 2018. (Year: 2018).
Friedrich, Johannes, and Mate Lengyel. "Goal-directed decision making with spiking neurons." Journal of Neuroscience 36, No. 5 (2016): 1529-1546. (Year: 2016).
Downing, Keith L. "Learning via Synaptic Tuning." Chapter 10, pp. 231-274. (2015) (Year: 2015).

* cited by examiner

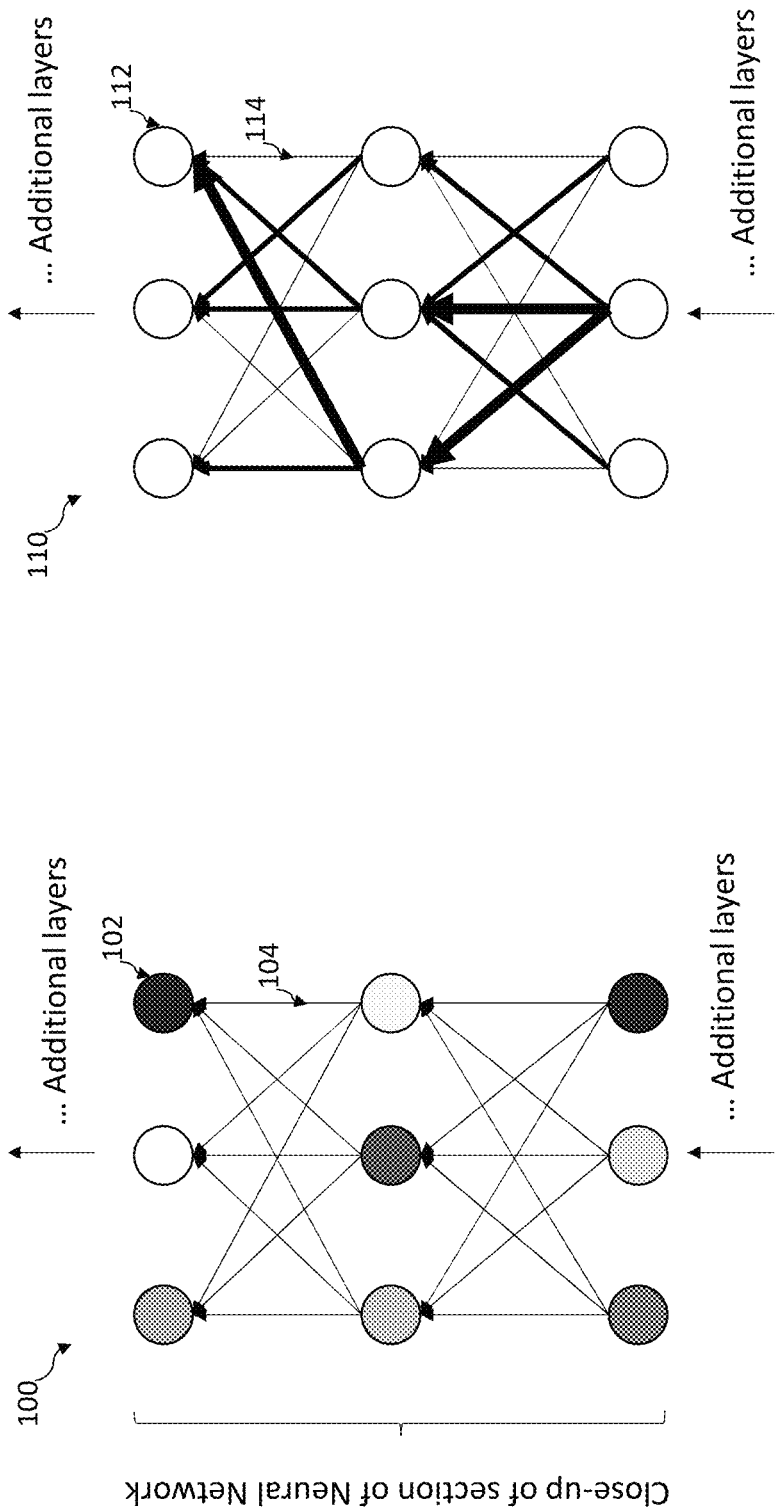
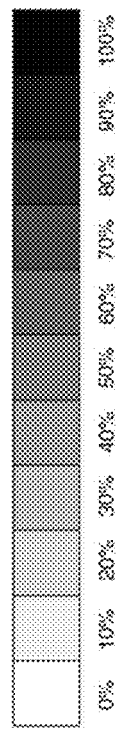
Fig. 1A
Fig. 1B

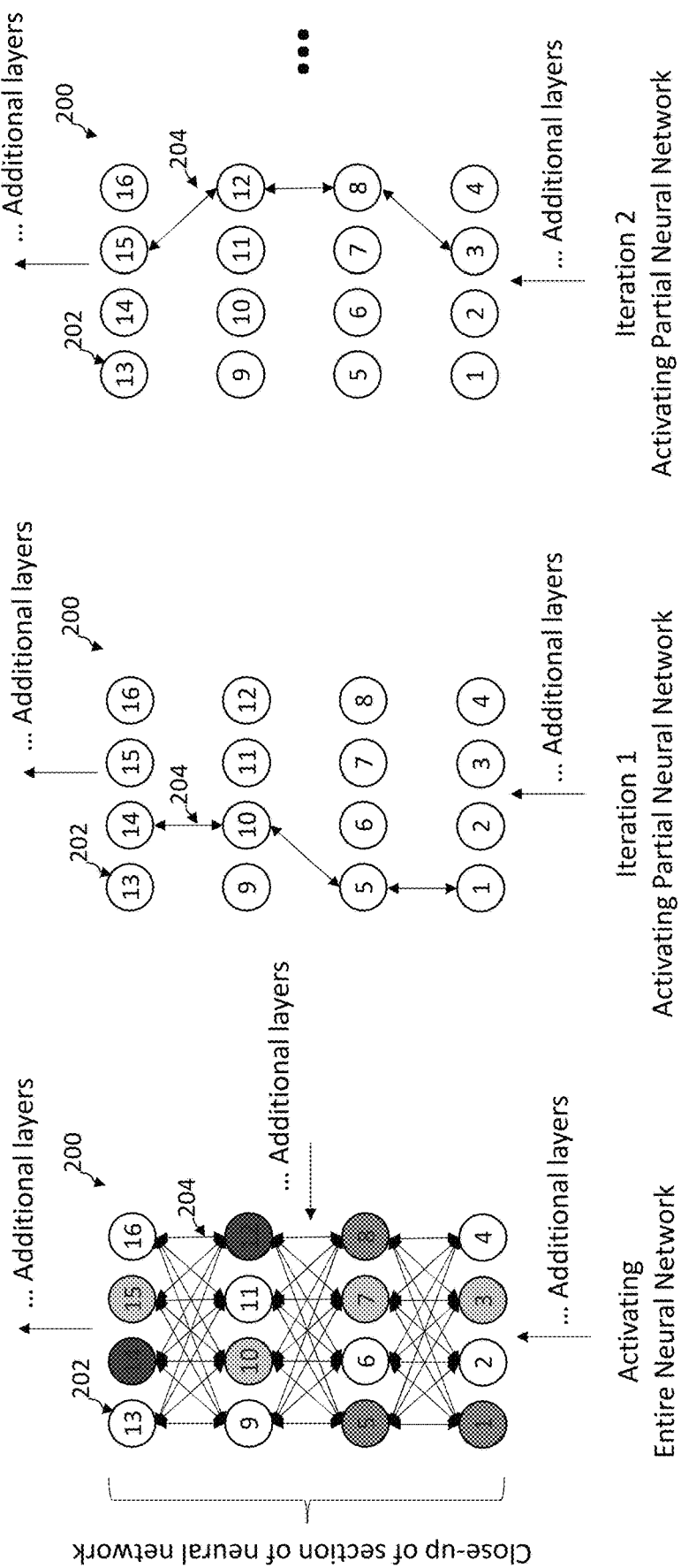

PARTIAL-ACTIVATION OF NEURAL NETWORK BASED ON HEAT-MAP OF NEURAL NETWORK ACTIVITY

PRIOR APPLICATION DATA

The present application is a continuation of prior U.S. patent application Ser. No. 16/916,543 filed on Jun. 30, 2020 and entitled PARTIAL-ACTIVATION OF NEURAL NETWORK BASED ON HEAT MAP OF NEURAL NETWORK ACTIVITY, incorporated by reference herein in its entirety.

FIELD OF THE INVENTION

Embodiments of the invention are related to the field of artificial intelligence (AI) by machine learning. In particular, embodiments of the invention are related to deep learning using neural networks.

BACKGROUND OF THE INVENTION

An artificial neural network, or simply "neural network" (NN), is a computer model, resembling a biological network of neurons, which is trained by machine learning. A traditional neural network has an input layer, multiple middle or hidden layer(s), and an output layer. Each layer has a plurality (e.g., 100s to 1000s) of artificial "neurons." Each neuron in a layer (N) may be connected by an artificial "synapse" to some or all neurons in a prior (N−1) layer and subsequent (N+1) layer to form a "partially-connected" or "fully-connected" neural network. The strength of each synapse connection is represented by a weight. Thus, a neural network may be represented by a set of all weights in the network.

A neural network is trained based on a learning dataset to solve or learn a weight of each synapse indicating the strength of that connection. The weights of the synapses are generally initialized, e.g., randomly. Training is performed by iteratively inputting a sample dataset into the neural network, propagating forward through the neural network to output a result of the neural network applied to the dataset, calculating errors between the expected (e.g., target) output and actual output, and propagating backwards through the neural network to adjust neural network weights using an error correction algorithm (e.g., backpropagation) to minimize errors. Training may be repeated until the error is minimized or converges. Typically, multiple passes (e.g., tens or hundreds) through the training set is performed (e.g., each sample is input into the neural network multiple times). Each complete pass over the entire training dataset is referred to as one "epoch."

State-of-the-art neural networks typically have between millions and billions of weights, and as a result require specialized hardware (e.g., a GPU) for both training and runtime (a.k.a. prediction or inference) phases. It is thereby impractical to run deep learning models, even in prediction mode, on most endpoint devices (e.g., IoT devices, mobile devices, or even laptops and desktops without dedicated accelerator hardware). Effectively running deep learning models on devices with limited processing speed and/or limited memory availability remains a critical challenge today.

To address the problem of limited hardware capacity, nowadays most deep learning prediction is conducted on a remote server or cloud. For example, a smart assistant (e.g., Alexa™) sends information (e.g., a voice signal) to the cloud, the deep learning prediction is performed remotely at the cloud on dedicated hardware, and a response is sent back to the local device. Hence, these endpoint devices cannot provide deep learning based results if they are disconnected from the cloud, if the input rate is so high that it is not feasible to continuously communicate with the cloud, or if very fast prediction is required where even the dedicated hardware is not fast enough today (e.g., deep learning for high frequency trading).

Accordingly, there is a need in the art to increase the efficiency and processing speed of the computer performing deep learning using a neural network in training and/or prediction modes.

SUMMARY OF THE INVENTION

A device, system and method is provided to significantly increase the processing speed and efficiency and reduce power consumption of executing a neural network by, instead of activating all neurons, synapses, and/or filters across an entire neural network in each pass (a "fully-activated" neural network), embodiments of the invention activate only a partial subset of those neurons/synapses/filters in each current or future iteration (a "partially-activated" neural network) based on their historical patterns of activity in previous iterations encoded in a "heat map." A heat map may record past or historical activity levels for each individual or group of neurons/synapses/filters. Historical activity levels may be displayed, e.g., by corresponding color or grayscale levels in heat map 100 of FIG. 1A or weight thickness levels in heat map 110 of FIG. 1B. Neurons/synapses/filters may be activated in future training or prediction iterations at an iteration proportion or frequency commensurate with, e.g., proportionally to, their historical activation frequency. Thus, historically high-activity neurons/synapses/filters ("hot spots" on the heat map) may be activated in future iterations with greater frequency than historically low-activity neurons/synapses/filters ("cold spots" on the heat map). Historical activity metrics may be dynamically adjusted as activity levels change over the lifetime of the training or prediction phases. Activating neurons/synapses/filters with frequencies commensurate with historical activity patterns prevents over-activating or under-activating neurons/synapses/filters to optimize computer efficiency and neural network accuracy.

According to some embodiments of the invention, there is provided a device, system and method for training or prediction of a neural network. A current value may be stored for each of a plurality of synapses or filters in a neural network. A historical metric of activity may be independently determined for each individual or group of one or more of the synapses or filters during one or more past iterations. A plurality of partial activations of the neural network may be iteratively executed. Each partial-activation iteration may activate a subset of the plurality of synapses or filters in the neural network. Each individual or group of synapses or filters may be activated in a portion of a total number of iterations proportional to the historical metric of activity independently determined for that individual or group of synapses or filters. Training or prediction of the neural network may be performed based on the plurality of partial activations of the neural network.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A and 1B are schematic illustrations of heat maps of historic activity levels of neurons or synapses for a portion of a neural network, in accordance with some embodiments of the invention;

FIG. 2A is a schematic illustration of an example neural network region associated with a historical activity heat map, in accordance with some embodiments of the invention;

FIGS. 2B and 2C are schematic illustrations of a first and second respective partial activations of the neural network of FIG. 2A according to its associated historical activity heat map, in accordance with some embodiments of the invention;

Figure 3:
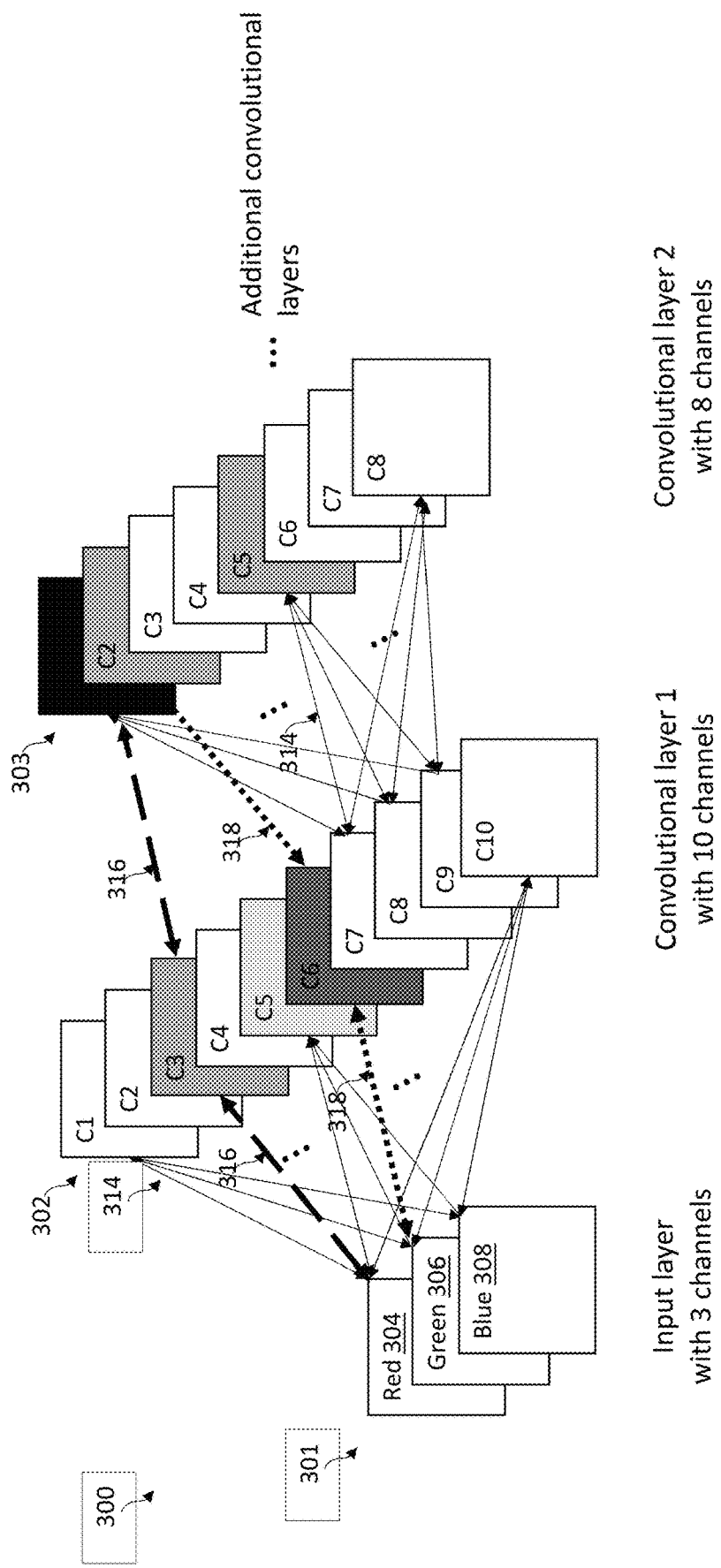
FIG. 3 is a schematic illustration of partially activating a convolutional neural network according to its historical activity heat map, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention partially-activate a subset of a neural network's neurons, synapses and/or filters in each pass based on a "heat map" of historical metrics of neuron/synapse/filter activity. The heat map may record, for each individual or group of neurons/synapses/filters, not only their current weights or values, but also their historical metrics of activity from one or more past iteration(s). A historical metric of activity may be, for example, a frequency that each individual or group of neurons/synapses/filters is activated, a magnitude of the associated synapse/filter weight(s) or value(s), a magnitude of a change in the synapse/filter weight(s) or value(s) during error correction, an average median or standard deviation of any of those measures, derivate or second derivatives of the directions of change of those metrics over time (e.g., speed of change, momentum of change, etc.), or amount of contribution to the final output of the network, or any other value derived from an individual or combination of those metrics. Neurons, synapses and/or filters may be measured for historical metrics of activity and/or activated independently for each single neuron/synapse/filter or together in groups of multiple neurons/synapses/filters. Groups may include continuous sequences of neurons/synapses/filters along pathways linking an input layer to an output layer, all synapses directly connected to each neuron, all filters directly connected to each group of neurons in a convolutional neural network, etc. Groups may (or may not) overlap so that one neuron/synapse/filter may (or may not) belong to multiple groups. An neuron/synapse/filter may be considered "activated" when, e.g., during a forward pass it contributes a computation for prediction, or during a backward pass when it contributes an error correction for training, that is non-zero, above threshold, or significant (e.g., greater than 5-10% of the mean contribution of all or neighboring neurons/synapses/filters). The activation threshold may be set or tuned to be a fixed number or dynamically adjusted, e.g., based on real-time monitoring of neural network accuracy, availability of hardware resources, etc. Partial-activation may be implemented during training and/or prediction phase(s) and/or during backward and/or forward passes of the neural network.

According to embodiments of the invention, instead of activating all neurons/synapses/filters in a NN with equal frequency, the NN learns their historical patterns of activity and activates them according to those historical patterns. Neurons/synapses/filters activated with relatively high weights or frequencies ("hot spots" on the heat map) may be activated more often than neurons/synapses/filters activated with relatively low weights or frequencies ("cold spots" on the heat map). In this way, relatively low-activity neurons/synapses/filters are not over-activated (wasting computational resources for minimal contribution) and relatively high-activity neurons/synapses/filters are not under-activated (missing significant changes for minimal computational savings). The relationship between neurons/synapses/filters' past and future frequencies/weights may be constant or one-to-one (e.g., using the same future activation frequency as its past activation frequency), accelerated or 1:N (e.g., using a greater future activation frequency than its past activation frequency), or decelerated or N:1 (e.g., using a lower future activation frequency than its past activation frequency). Activating neurons/synapses/filters at an iteration frequency commensurate with, e.g., proportionally to, their historical activation frequency and/or magnitude, maximizes network resources for significant activations and minimizes network resources for inconsequential or less significant activations.

Embodiments of the invention significantly increase the speed and efficiency of executing a neural network by implementing a "partially-activated" neural network approximating the fully-activated neural network by activating only a subset of neural network neurons, synapses, and/or filters based on their historical activity represented in a heat map. Partial-activation reduces the number of computations, increases the speed of training and/or prediction, and reduces the power consumption of the NN, by an amount proportional to the number of skipped neurons/synapses/filters. For example, partial activation of 10% of the NN's neurons/synapses/filters may be performed 10 times faster than a fully-activated NN. Partial activation during a training phase in both the forward and backward passes achieves twice those gains. Although additional processing and memory resources are consumed to measure and record the NN's heat map (e.g., storing a number of bots e.g. 8 per activity record and processing records every N iterations), those resources are minor compared to the significant gains of the partially-activated NN. In some embodiments, the heat map records may be stored in order of the value of its historical activity metric (e.g., from highest to lowest), or segmented into above and below threshold batches, so only the top or above threshold records are evaluated, thereby eliminating processing below threshold historical activity metrics for neurons/synapses/filters that should be not activated.

The total number of neurons, synapses or filters activated by the partially-activated neural network may be $\Sigma_i^M X_i Y$ where i represents the ith one of the M total neuron or synapse in a neural network, $X_i$ represents the activation frequency of the ith neuron/synapse/filter and Y represents the total number of iterations during training or prediction. To increase efficiency, the activation frequency $X_i$ may be significantly smaller than (e.g., 1-10% of) the total number of Y iterations, $X_i \ll Y$, and the total number of neurons/synapses/filters activated by the partially-activated neural network is less than (e.g., 10-50%) the number of all N synapses in the neural network, $\Sigma_i^M X_i Y < N$. For example, a partially-activated neural network may activate a total of 10% of the synapses in the neural network. The greater the number of activated neurons/synapses/filters in the partially-activated neural network, the greater the accuracy with which the partially-activated neural network approximates the fully-activated neural network, but the more computations are solved. Thus, the proportion of neurons/synapses/filters activated in the partially-activated neural network may be set depending on the tradeoff of priorities between speed and accuracy in each system or application. In one example, experiments show that an example partially-activated neural network activating a total of 10% of the N synapses performed with 99% accuracy and 10 times the speed of a conventional fully-activated neural network.

Additionally, experiments show that, for the same total number of neurons/synapses/filters activated in a partially-activated neural network, accuracy is improved by executing more pathways of smaller size than fewer pathways of larger size. For example, an experiment found that a partially-activated neural network in which 1% of the neurons were activated in each of 10 runs yielded better results than a partially-activated neural network in which 10% of the neurons were activated in a single run. A reason for this trend is that executing more iterations of smaller groups of neurons/synapses/filters activates neurons/synapses/filters with greater overall diversity, thereby widening the search space across the neural network. This is because each disconnected group can reach farther parts of the neural network, as compared to a larger clusters of neurons/synapses/filters with fewer iterations that is primarily concentrated in one region of the neural network. Conversely, fewer groups of neurons/synapses/filters of larger size adds more synapses localized around the same region of the neural network, which typically yield duplicative results, providing diminishing returns. The more independent, diverse, and disconnected synapses in each group are, the wider the reach of the partially activated synapses, and typically the better the partially-activated neural network approximates the fully-activated neural network. Accordingly, in various embodiments, the number of iterations and synapses per iteration may be adjusted to optimize network diversity.

In various embodiments, the activation frequency $X_i$, the number of iterations Y, the total number of activated neurons/synapses/filters $\Sigma_i^M X_i Y$, and/or the proportion future to past activity in the partially-activated neural network may be fixed or dynamic. In some embodiments, the activation frequency $X_i$ of each individual or group of neurons/synapses/filters is set or tuned to be a fixed number or proportion of the historical activity metric (e.g., past frequency or magnitude), dynamically adjusted to keep error below a threshold, dynamically adjusted inversely proportionally to error, dynamically adjusted to keep the total number of activations $\Sigma_i^M X_i Y$ below threshold a threshold (e.g., the total number of neurons/synapses/filters in the neural network), dynamically adjusted to asymptotically decrease or increase as the prediction results converge or diverge in multiple iterations of prediction or as the error converges to or diverges from zero during training, respectively. In some embodiments, the activation frequency $X_i$ may be dynamically adjusted based on real-time data, e.g., monitoring the availability of hardware resources, such as, processor speed, memory space available, remaining battery life, and/or other hardware or software resources.

Regarding the number Y of total iterations, in some embodiments, a variable number Y of iterations may be executed until the prediction results converge or the accuracy of the training results are above a predetermined threshold (or equivalently, the error is below a predetermined threshold) with respect to the training dataset. In some embodiments, a variable number Y of iterations may be executed until a computation time or decision time is reached. In real-time applications, a processor may only have a duration of time to make a decision. For example, a vehicle may have 1 second to decide whether or not to stop, and the system may execute as many iterations as possible in that time. Because partial activation used fewer computations per iteration, more partial runs of a neural network may be performed in a fixed time, and thus the accuracy of the output may be improved in a fixed time, as compared to full activation of the same neural network.

The neural network may be initiated in a first iteration as a full-activated neural network (activating all neurons/synapses/filters), after which relatively lower-activity neurons/synapses/filters are incrementally deactivated (activated at a lower frequency) in subsequent iterations. Alternatively, the neural network may start as a partially-activated neural network (activating a subset of "seed" neurons/synapses/filters in a first iteration), after which relatively high-activity neurons/synapses/filters are incrementally activated (activated at a higher frequency) and relatively lower-activity neurons/synapses/filters are incrementally deactivated (activated at a lower frequency) in subsequent iterations. In some embodiments, an initial iteration's partial subset of "seed" neurons/synapses/filters may be selected fully or semi randomly, for example, to maximize the diversity of and maintain an even distribution of seed neurons/synapses/filters across the neural network, thereby providing neurons/synapses/filters in each region with a substantially equal opportunity to increase or decrease their activation frequency. In some embodiments, an initial iteration's partial subset of "seed" neurons/synapses/filters may be selected as a best-guess, for example, based on an input, where various inputs or input patterns may be optimally correlated with partial-activation neuron/synapse/filter patterns.

In some embodiments, a hybrid combination of partially-activating and fully-activating the neural network may be performed for different iterations, layers, filters, channels, or modes of operation. Some embodiment may alternate between partially-activating and fully-activating the neural network according to a predetermined schedule. Additionally or alternatively, some embodiments may switch between partially-activating and fully-activating the neural network when a measure of error or accuracy crosses a threshold. In various embodiments, partial-activation may be used only during prediction mode (forward propagation (but not backward propagation) though the neural network), only during training mode (forward and/or backward propagation though the neural network), or during both prediction and training modes. Additionally or alternatively, partial activation may be used across only portions of the neural network, for example, only specific neural network layers, regions, channels, iterations, etc. When partial-activation is not implemented, full-activation of all synapses in the entire neural network may be activated. Thus, in some embodiments, the inventive partially-activated neural network method may be combined with the fully-activated neural network method to create a hybrid method, in which each method is respectively used for different layers, regions, channels, iterations, modes, etc. of the neural network.

During training, because neurons/synapses/filters are activated to correct errors at frequencies commensurate with their historical activation, while a neuron/synapse/filter's training update may be skipped for an individual iteration, those updates are merely deferred to a later iteration, which on average occurs at the same frequency as during full-activation (otherwise updates that occur less frequently accumulate and thereby compensate for any missed updates). Accordingly, the accuracy of training using partially-activated NNs is typically substantially the same as training using fully-activated NNs. During prediction, because neurons/synapses/filters are skipped that have low or below threshold effect on the NN, prediction using partially-activated NNs may be substantially the same as prediction using fully-activated NNs. Further, because each partial-activation pass is performed faster than a full-activation pass, more passes may be performed in the partially-activated NN in the same total training or prediction time compared to conventional fully-activated NNs. The neural network may thereby be divided into a greater number of smaller partial passes, which has been experimentally shown to closely approximate the accuracy of the fully-activated neural network at significantly reduced processing time compared to fully-activating the neural network, thereby yielding faster and more efficient training and prediction.

Reducing processing time and computational complexity may allow devices with basic hardware (e.g., endpoint devices 450 of FIG. 4), to efficiently execute neural networks locally, without relying on the cloud (e.g., remote server(s) 410 connected over network 420). Regardless of whether training and/or prediction (inference) is performed on a local device or in the cloud, that training and/or prediction may be performed either using lower quality (and thus, less expensive) hardware (e.g., with lower processing speed) for the same time and accuracy, or with better performance using the same quality hardware, compared to conventional training and/or prediction.

Embodiments of the invention may be used with all types of neural networks, for example, including partially-connected neural networks, fully-connected neural networks (e.g., shown in FIGS. 1A and 2A), convolutional neural networks (CNNs) (e.g., shown in FIG. 3), recurrent neural networks (RNNs), restricted Boltzmann machines (RBM), or in general any neural network model which involves a combination of neurons, filters, and/or weights.

Reference is made to FIGS. 1A and 1B, which are schematic illustrations of heat maps 100 and 110, respectively, recording historic activity levels of neurons 102 and 112 or/or synapses 104 and 114 in a neural network, in accordance with some embodiments of the invention. For clarity, the example heat maps 100 and 110 shown in FIGS. 1A and 1B are close-up or partial views of a larger heat map associated with a larger neural network (e.g., additional layers before, after or in between the layers in the figure). Heat maps 100 and 110 may represent data stored in memory and/or visualizations displayed to a user on a computer screen of a display device (e.g., screen 428 of local device 450 or a screen on remote server 410).

Heat maps 100 and 110 visualize historic activity levels of associated neurons or synapses, for example, using gradations in color or grayscale levels in FIG. 1A and/or using gradations in neuron or synapse connection thickness in FIG. 1B. Other visualizations may use additional or alternative gradations of e.g., neuron size, brightness, translucencies, patterns, etc. to represent variations in historic activity levels. FIG. 1A comprises a key to show the correlation between grayscale levels and historic activity levels, e.g., as a percent or proportion of iterations each neuron or synapse was activated in a plurality of past iterations.

Heat maps 100 and 110 may be dynamically updated, e.g., in real-time, visualizing changing patterns in neuron/synapse/filter activity over time. Dynamically updated heat maps may resemble a moving image of a sequence of frames for each of a sequence of one or more respective iterations. Users can watch the moving image of the heat map in real-time or after the training or prediction to learn how the neural network behaves and evolves over time. That visual information of the evolution of neural network activity may give users insights to optimize network architecture, runtimes, activity or convergence thresholds, or other neural network parameters. In some embodiments, visualizing which regions have more activity allows a user to manually prune low activity neurons/synapses/filters or entire regions, adjust the architecture (e.g., eliminating low-activity layers, columns, rows, regions, etc.), select a level or percentage of sparsification commensurate with the visualized activation density, etc. For example, visualizing different regions activated for different inputs allows users to prune the neural network further depending on the input, and know in advance what areas need to be activated for a given input. This can further allow us to better understand the flow of information in a neural network, and design improved architectures (e.g., in terms of number of layers, number of neurons/filters in each later, etc.). Because the inner-workings of neural networks are not well understood, the ability to see inside the mechanics of training and prediction activity and its change over time in a neural network provides data scientists with invaluable insights into neural network operation and design.

Reference is made to FIG. 2A, which is a schematic illustration of a close-up portion of an example neural network 200 associated with a historical activity heat map, in accordance with some embodiments of the invention.

Neural network 200 includes a plurality of artificial neurons 202. Artificial neurons 202 may be arranged in a hierarchy of multiple layers. Neural network 200 may include an input layer (e.g., neurons 1-4), one or more middle or hidden layer(s) (e.g., neurons 5-8), and an output layer (e.g., neurons 9-12), and/or additional layers before, after or in between the layers in the figure. Each neuron 202 in each layer is connected by an artificial synapse connection 204 to some neurons (partially-connected) or to all neurons (fully-connected) in an adjacent layer. Neurons (1-4) in the input layer are connected to neurons in the subsequent higher layer, neurons (5-8) in the middle layer are connected to neurons in both the previous and subsequent layer, and neurons (9-12) in the output layer are connected to neurons in the previous lower layer. In the example shown in FIG. 2A, neural network 200 has 16 neurons 202 connected by a total of N=48 synapses 204. Neural network 200 may be represented by a plurality of weights representing the strengths of the respective plurality of synapse connections 204.

Although FIG. 2A shows a fully-connected neural network 200, neural network 200 may alternatively be a partially-connected neural network (removing some synapses), a recurrent neural network (adding self-connecting synapses between neurons in the same layer), or a convolutional neural network (replacing neurons with channels and synapses with filters).

Each neuron 202 or synapse 204 in neural network 200 is associated with its current weight value and heat map data of past or historic activity metrics, such as, a past activation frequency, a past neuron/synapse magnitude, a past change neuron/synapse/filter magnitude, etc. Heat map data and NN neuron/synapse data may be stored together in the same or separately in different data structure(s) (e.g., in one or more sequence(s), table(s), matri(ces), etc.). Heat map and neuron/synapse data may be associated with each other, e.g., by indexing, unique identifiers, mapping memory locations, order in the same or different data structure(s) such as table(s) or matri(ces), or any other data structures or relationships.

Conventional systems fully-activate all N synapses of neural network 200 in each run. In each fully-activated run of neural network 200, a processor performs a single propagation through neural network 200 in a forward direction to compute all N synapses of the network (in prediction mode) and/or an additional single propagation through neural network 200 in a backwards direction to re-compute all N synapses for error correction (in training mode). While a small neural network is shown in FIG. 2A for clarity (e.g., N=48 synapses), most current neural networks have millions or billions of synapses or filters, making each fully-activated run a computationally arduous and time-consuming task.

According to embodiments of the invention, there is provided a system and method for partially-activating neural network 200 to approximate the fully-activated neural network with high accuracy in significantly faster time. In each partially-activated run of neural network 200, a processor may perform a plurality of partial activations of neural network 200 in a forward and/or backwards direction, where each ith neuron/synapse is activated with an activation frequency of $X_i$ proportional to its historical activity metric and less than the total number of iterations Y. In some embodiments, there may be a subset of permanently activated neurons/synapses or deactivated/deleted/pruned neurons/synapses. A total number of activated neurons/synapses $\Sigma_i^M X_i Y$ may be computed, e.g., that is only a partial subset of, and less than, the total number N of all synapses executed in the same number of iterations Y of the fully-activated neural network. Thus, a significant number of the remaining synapses, not activated during the partial activation, $N-\Sigma_i^M X_i Y$, are not computed, yielding a reduction in the computations performed for partially-activation of the neural network as compared to a full-activation of the neural network. In some embodiments, because disjointed or discontinuous neurons/synapses yield no output, neurons/synapses may be activated in continuous pathways or sequences of neurons or synapses linking an input layer to an output layer. Thus, some individual low-activity neurons/synapses may be activated to link high-activity neurons/synapses. Accordingly, activation of individual neurons may depend on heat map data for neighboring neurons/synapses, and/or may be evaluated collectively for groups of neurons/synapses, e.g., forming continuous input-to-output pathway. In one example, a partially-activated neural network includes four continuous pathways having the four respective highest collective historical activity metrics. Each pathway has three synapses, yielding a total of 12 synapses (25% of all N=48 synapses, for a speed-up of four times compared to a conventional fully-activated neural network). Similarly, in training mode, in addition to forward propagation, a backwards propagation of the same subset of synapses is performed, yielding double the reduction in the computations performed for each partially-activated training (forward and backwards) run of the neural network as compared to a fully-activated training run of the neural network. Thus, in the prior example, the partially-activated neural network is trained eight times faster than the conventional fully-activated neural network.

Reference is made to FIGS. 2B and 2C, which schematically illustrate a first and second respective partial activations of neural network 200 of FIG. 2A, in accordance with some embodiments of the invention. In FIGS. 2B and 2C, while only two partial activation iterations are illustrated due to space limitations, an ellipsis indicates that a greater number Y of partial activation iterations may be used (e.g., Y=3, . . . , 10, . . . , 100, . . . , 1000, . . . , 1,000,000, . . . , 1,000,000,000, . . . ).

The multiple partial pathways shown in FIGS. 2B and 2C comprise different respective sequences of synapses continuously linking a single neuron in an input layer (e.g., bottom layer) to a single neuron in an output layer (e.g., top layer). In one embodiment, each partial pathway may include a continuous or uninterrupted sequence of synapses connected by a line or path propagating the network that is not disconnected from input neuron to output neuron (e.g., a pen drawing the propagation path is never raised from the paper). In the example shown in FIGS. 2B and 2C, the partial pathways are linear (one-to-one synapse connections in adjacent layers), but other pathway patterns, such as branching (one-to-many synapse connections in adjacent layers), skip paths, recurrent paths, weaving paths, or a combination thereof, may be used. Other groups or clusters of neurons/synapses may be used.

In some embodiments, a "hybrid" partial and fully activated neural network may be used where some regions, layers, channels, iterations, modes such as training vs. prediction, of the neural network are partially-activated, while others are fully-activated. For example, in one embodiment, the training mode (e.g., usually executed offline) may be full-activated, while the prediction mode (e.g., usually executed in real-time) is partially-activated because speed is typically more important during prediction than during training. In other embodiments, the training mode may be partially activated (e.g., because it is the relatively more time-consuming task), whereas the prediction mode may be fully activated (because it is the relatively less time-consuming task). Other embodiments may alternating between partial-activation and full-activation for according to a predetermined schedule (such as, one full-activation per every N partial activations) or when a measure of error or accuracy crosses a threshold. Other embodiments may have a maximum deactivation period after which neurons/synapses are reactivated when they have been inactive for a greater than threshold time or number of iterations. This allows a previously low-activity or obsolete neuron/synapse to be reintroduced periodically to test if any changes made during training now render those neuron/synapse more important to warrant their reintroduction into the network.

Additionally or alternatively, because partial-activation is only an approximation of the full neural network, partial-activation may be used in an initial stage (e.g., the first P iterations, or until the output converges during predictions or the error converges during training to within a threshold) and thereafter the fully-activated neural network may be run (e.g., the next or last Q iterations, or until the output converges or the error converges to zero) to confirm the initial partial approximation. Additionally or alternatively, partial activation may be used in specific layers (e.g., deeper middle layers which often have a less direct effect on the final result), while a fully connected network may be used for the remaining layers (e.g., layers near the input and output layers which often have a greater direct effect on the final result). Other hybrid combinations of partial and fully activated neural networks may be used.

Referring to FIG. 2B, the first partial activation iteration may be initialized by a "seed" or start group of neurons/ synapses that are selected e.g., randomly or as a best-guess based on the input (e.g., neuron "1"). The activity (non-zero or above threshold contribution) or inactivity (zero or below threshold contribution) of each neuron/synapse may be recorded for each iteration, and aggregated as its historical activity metric. In various embodiments, activity may be equally weighted in all iterations or may be weighted higher for more recent iterations (e.g., linearly or logarithmically with time).

Referring to FIG. 2C, the second partial activation iteration may activate neurons/synapses based on their historical activity metric in the previous first iteration of FIG. 2B. Each subsequent ith iteration may activate neurons/synapses based on their historical activity metric in one or more of the previous (e.g., i−1) iterations.

Reference is made to FIG. 3, which schematically illustrates partially activating a convolutional neural network 300 according to its historical activity heat map, in accordance with some embodiments of the invention.

Convolutional neural network 300 includes an input layer 301, one or more convolutional layers 302 and 303 (e.g., additional layers not shown), and one or more output layers. Each layer 301, 302, 303, . . . of CNN 300 may have one or a plurality of channels. In the example shown in FIG. 3, the input layer 301 represents a color image and has three color-channels 304, 306, and 308 (e.g., red, green and blue channels). The first convolution layer 302 has a plurality of (e.g., ten) channels (e.g., C1-C10) and the second convolution layer 303 has a plurality of (e.g., eight) channels (e.g., C1-C8). Each convolution channel may represent a feature map of a feature, such as edges, lines, circles, or more complex objects in higher layers, such as apples, hammers, etc. These channels of features typically emerge entirely from the training process of the neural network (and are not manually specified).

In a fully-connected CNN, each channel in a layer may be connected to each channel in a subsequent layer by a convolution filter 314. For example, each color-channel 304, 306, or 308 of input layer 301 may be connected by a convolution filter 314 to each convolutional channel C1-C10 in first convolution layer 302, which may in turn be connected by a convolution filter 314 to each convolutional channel C1-C8 in second convolution layer 303. In the example of FIG. 3, there are three channels 304-308 in the input layer 301, ten channels C1-C10 in the first convolution layer 302, and eight channels C1-C8 in the second convolution layer 303, resulting in a total of N=240 filters 314 connecting every pair of channels from the input and convolution layers 301, 302, 303, . . . . CNN 300 typically has many more convolution layers and/or other (e.g., max-pooling) layers than shown, which causes the number of filters 314 to grow exponentially (e.g., to thousands, millions, or billions of filters 314).

Each channel or filter in convolution neural network 300 may be associated with its current weight value and past or historic activity metrics, such as, a past activation frequency, a past neuron/synapse magnitude, a past change neuron/ synapse/filter magnitude, etc.

Embodiments of the invention may partially activate the convolutional neural network 300 of FIG. 3 by iteratively executing high-activity filters 316 and 318 (with above threshold historic activity metrics) that cumulatively span only a subset of all N filters 314 of the convolutional neural network 300 in each iteration. Over a plurality of iterations, each ith filter may be activated with an activation frequency of $X_i$ proportional to its historical activity metric and less than the total number of iterations Y. In some embodiments, there may be a subset of permanently activated or deactivated/deleted/pruned filters. A total number of activated filters $\Sigma_i^M X_i Y$ may be computed, e.g., that is only a partial subset of, and less than, the total number N of all filters executed in the same number of iterations Y of the fully-activated convolutional neural network 300. Thus, a significant number of the remaining filters 314, not activated during the partial activation, $N-\Sigma_i^M X_i Y$, are not computed, yielding a reduction in the computations performed for partially-activation of the convolutional neural network 300 as compared to a full-activation of the convolutional neural network. Only one iteration partially activating a subset of filters 316 and 318 is shown in FIG. 3 so as not to obscure the figure, though many more filters and iterations may be used. In some embodiments, e.g., during prediction, the total number of activated filters in all partial activation iterations may be less than the total number of all filters N in the CNN. In some embodiments, e.g., during training, the total number of activated filters in all Y partial activation iterations may be less than the total number of all filters N in the same number of Y iterations.

In CNNs, filters may be two-dimensional (2D) or three-dimensional (3D). 2D filters connect each single channel in a first layer with a single channel in a second layer and 3D filters connect each single channel in a second layer with a plurality of channels in a first layer. For example, the convolutional neural network 300 shown in FIG. 3 may connect the input and $1^{st}$ convolution layers with thirty 2D filters, or ten 3D filters. Partial activation may selectively activate (and deactivate or skip) 2D or 3D filters, or any combination thereof, in a CNN.

In general, partial activation of filters 314 in convolutional neural network 300 of FIG. 3 may use the same or different embodiments described in reference to the partial activation of neurons 202 or synapse 204 in neural network 200 of FIG. 2, with associated modifications as would be understood to a person of ordinary skill in the art.

Figure 4:
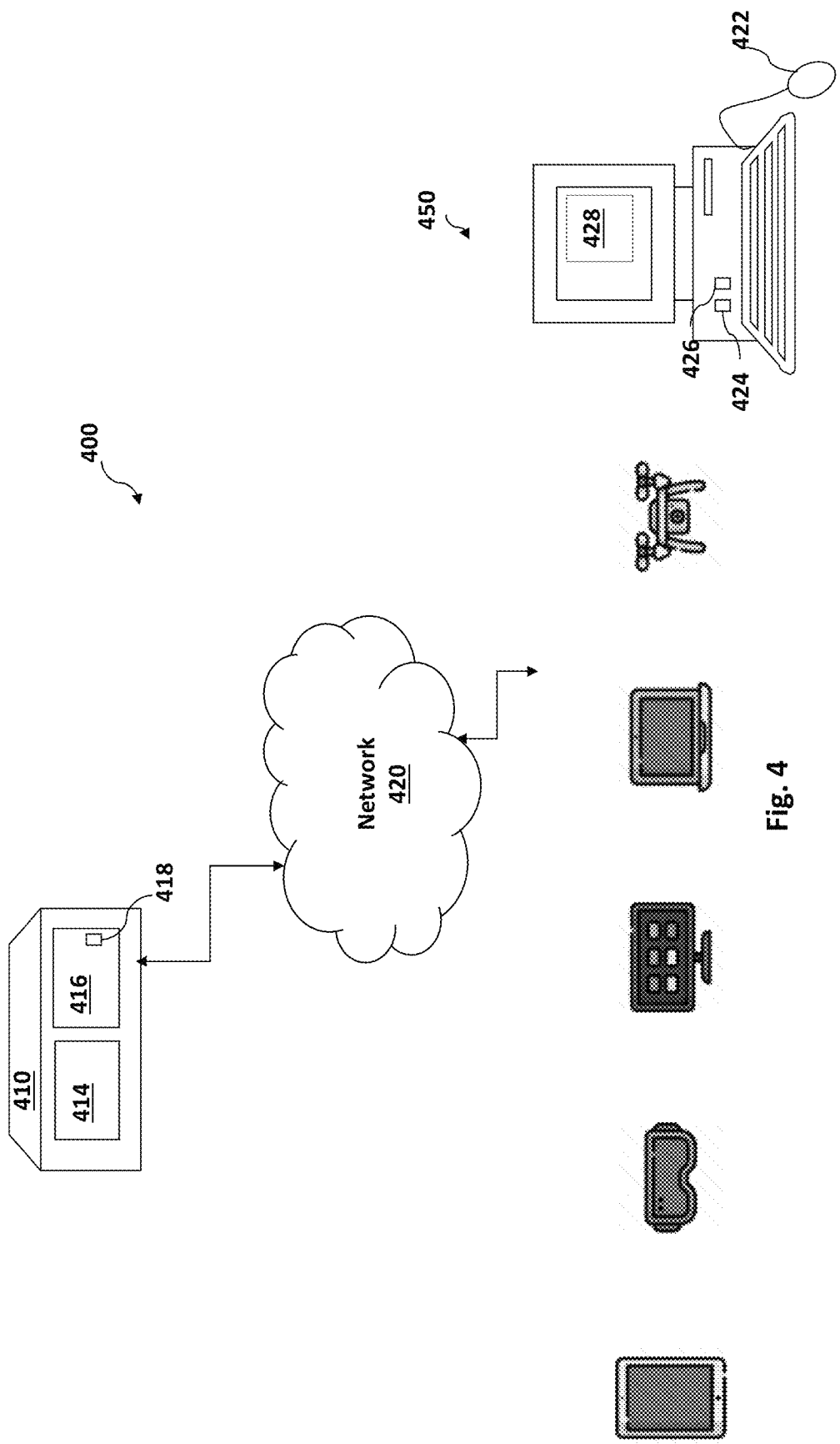
FIG. 4 is a schematic illustration of a system for partially activating a neural network according to its historical activity heat map, in accordance with some embodiments of the invention.

Reference is made to FIG. 4, which schematically illustrates a system 400 for partially activating a neural network according to its historical activity heat map, in accordance with some embodiments of the invention. System 400 may store and/or generate the neural networks and their associated historical activity heat maps, and may train and/or predict by partially-activation of neural networks as described in reference to FIGS. 1A-1B, 2A-2C, 3 and 5. For example, in reference to FIGS. 2A-2C, system 400 may partially-activate neural network 200 of FIG. 2A using the first and second partial activation iterations of FIGS. 2B-2C. In another example, in reference to FIG. 3, system 400 may partially-activate convolutional neural network 300 using a filter subset 316 and 318 in a partial activation iteration.

System 400 may include one or more local endpoint device(s) 450 and one or more remote server(s) 410 accessible to the local device via a network and/or computing cloud 420. Typically, the neural network is trained by remote server 410 and run for prediction at one or more local endpoint devices 450, although either remote server 410 and/or local endpoint devices 450 may train and/or predict the neural network using partial activation according to embodiments of the invention. In particular, partially-activating the neural networks significantly reduces the computational effort for prediction and training, as compared to conventional fully-activated neural networks, to allow local endpoint devices 450, which typically have very limited memory and processing capabilities, to quickly and efficiently perform such prediction and/or training. When local endpoint devices 450 perform training and runtime prediction, remote server 410 may be removed.

Remote server 410 may have a memory 416 and processor 414 for storing and retrieving a neural network and an associated historical activity heat map. Remote server 410 may store a complete neural network (e.g., for neural network excerpts 200 of FIG. 2A or 300 of FIG. 3) and remote processor 414 may partially activate the neural network for training and/or prediction. In some embodiments, remote server 410 may have specialized hardware including a large memory 416 for storing a neural network/heat map and a specialized processor 414 (e.g., a GPU). Memory 416 may store data 418 including a training dataset and data representing a plurality of weights of synapses or filters of the neural network and an associated historical activity heat map. Data 418 may also include code (e.g., software code) or logic, e.g., to enable storage and retrieval of data 418 according to embodiments of the invention.

Local endpoint device(s) 450 may each include one or more memories 426 for storing a neural network (e.g., 200 of FIG. 2A, or 300 of FIG. 3) provided in some embodiments of the invention. The memory 426 may store each of a plurality of weights of synapses or filters of the neural network and one or more associated historical activity metric(s). Local endpoint device(s) 450 may each include one or more processor(s) 424 for partially activating the neural network for training and/or prediction, based on the weights of the synapses or filters of the neural network and historical activity metrics stored in memory 426. During prediction, the neural network is run forward once. During training, the neural network is run twice, once forward to generate an output and once backwards for error correction (e.g., backpropagation). Each time the neural network is run, the number of computations is based on the number of synapses or filters traversed by the partial activation and the speed is increased proportionally to the reduction in the number of synapses or filters not computed by the partial activation of the neural network.

Remote processor 414 and/or local processor 424 may partially activate the neural network by iteratively activating a subset of the plurality of synapses or filters in the neural network (e.g., first and second partial activation iteration of FIGS. 2B-2C of FIG. 2 or partial activation iteration of filters 316 and 318 of FIG. 3). Remote processor 414 and/or local processor 424 may execute each individual or group of synapses or filters in a portion of a total number of iterations proportional to the historical metric of activity independently determined for that individual or group of synapses or filters. During training, remote processor 414 and/or local processor 424 may perform a plurality of backward pass error correction iterations. During prediction, remote processor 414 and/or local processor 424 may generate a plurality of partial outputs for the plurality of respective partial passes, and may aggregate (e.g., average) the plurality of partial outputs to approximate an output generated by fully-activating the neural network by executing a single instance of all synapses or filters of the neural network. As shown experimentally, a processor (e.g., remote and/or local processor(s) 414 and/or 424) that partially-activated an example neural network by traversing 10% of the total number of N synapses, performed with 99% of the accuracy and 10 times the speed of the processor fully-activating the neural network.

Local endpoint device(s) 450 may include smart devices, personal computer, desktop computer, mobile computer, laptop computer, and notebook computer or any other suitable device such as a cellular telephone, personal digital assistant (PDA), video game console, etc., and may include wired or wireless connections or modems. Local endpoint device(s) 450 may include one or more input device(s) 422 for receiving input from a user (e.g., neural network parameters, such as, numbers, sizes, dimensions and configurations of neurons, synapses, and layers, activity, accuracy, error, convergence or training thresholds, number of Y partial activation iterations, total number or proportion of synapses or filters activated in a partially-activated neural network $\Sigma_i^M X_i Y$, distribution of activated neurons, synapses, filters or pathways, in a partially-activated neural network, pattern or groups of synapses or filters, etc.). Local endpoint device(s) 450 may include one or more output device(s) 428 (e.g., a monitor or screen) for displaying data to a user generated by local endpoint device(s) 450 or remote server 410.

In various applications, local endpoint device(s) 450 is part of a system for image recognition, computer vision, virtual or augmented reality, speech recognition, text understanding, or other applications of deep learning. In the application of facial recognition, a device may use partial activation to efficiently perform facial recognition to trigger the device to unlock itself or a physical door when a match is detected. In the application of security, a security camera system may use partial activation to efficiently detect a security breach and sound an alarm or other security measure. In the application of autonomous driving, a vehicle computer may use partial activation to control driving operations, e.g., to steer away to avoid a detected object.

Network 420, which connects local endpoint device(s) 450 and remote server 410, may be any public or private network such as the Internet. Access to network 420 may be through wire line, terrestrial wireless, satellite or other systems well known in the art.

Local endpoint device(s) 450 and remote server 410 may include one or more controller(s) or processor(s) 414 and 424, respectively, for executing operations according to embodiments of the invention and one or more memory unit(s) 416 and 426, respectively, for storing data 418 and/or instructions (e.g., software for applying methods according to embodiments of the invention) executable by the processor(s). Processor(s) 414 and 424 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 416 and 426 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 418 may be stored locally in memory 426 and no separate server 410 may be used.

Figure 5:
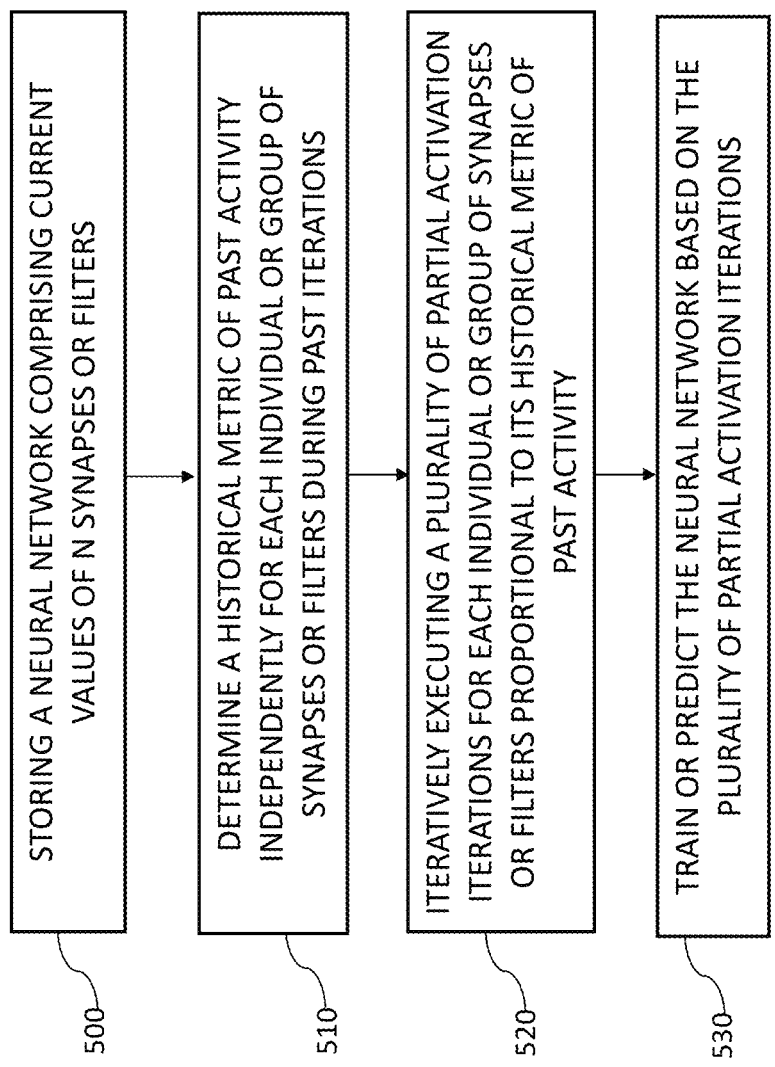
FIG. 5 is a flowchart of a method for partially activating a neural network according to its historical activity heat map, in accordance with some embodiments of the invention.

Reference is made to FIG. 5, which is a flowchart of a method for partially activating a neural network according to its historical activity heat map, in accordance with some embodiments of the invention. The operations of FIG. 5 may be executed by a processor (e.g., one or more processor(s) 414 and/or 424 of FIG. 4) using data stored in a memory (e.g., one or more memory unit(s) 416 and/or 426 of FIG. 4).

In operation 500, a processor may store a neural network (e.g., 200 in 2A or 300 in FIG. 3) comprising current weight values of each of a plurality of N synapses or filters in a memory. A CNN may have filters that are 2D and/or 3D.

In operation 510, a processor may determine one or more historical metrics of activity independently for each individual or group of one or more of the synapses or filters during one or more past iterations. Historical metrics of activity may include a frequency that each individual or group of synapses or filters was activated in one or more past iterations, a magnitude of the synapse or filter weights in one or more past iterations, a magnitude of a change in the synapse or filter weights in one or more past error correction iterations, an average median or standard deviation of any of those measures, or a value derived from any individual or combination thereof. Groups of synapses or filters may include, for example, sequences of synapses or filters forming neural network pathways linking a continuous sequence of synapses or filters from an input layer to an output layer, groups of synapses each directly connected to a neuron, and/or groups of filters each directly connected to a group of neurons in a convolutional neural network.

Historical metrics of activity may be visualized in a heat map (e.g., 100 of FIG. 1A or 110 of FIG. 1B) on a display (e.g., 428 of local device 450 or a screen on remote server 410). Historical metrics of activity may be dynamically updated, e.g., periodically, according to a schedule, each one or more iterations, or each one or more times an individual or group of synapses or filters is activated. In some embodiments, heat map may visualize a moving image of a sequence of frames representing the historical metrics of activity for a respective sequence of partial activation iterations. Playing the moving image may visualize the change in activity distributed within the neural network over the lifetime of the training and/or prediction phases.

In operation 520, a processor may partially-activate the neural network by iteratively executing a plurality of partial activations of the neural network. Each partial-activation iteration may activate a subset of the plurality of synapses or filters in the neural network. Each individual or group of synapses or filters may be activated in a portion of a total number of iterations proportional to the historical metric of activity independently determined for that individual or group of synapses or filters.

In a first partial activation iteration, the processor may initiate training or prediction by fully activating all synapses or filters of the neural network and incrementally deactivating individual or groups of synapses or filters with relatively low or below threshold activity historical metrics of activity, and reactivating synapses or filters that were deactivated but since have above threshold historical metrics of activity. In other embodiments, the partial activation iteration may begin with a partially-activated neural network (e.g., selected randomly or based on the input data), after which synapses or filters are incremental activated or deactivated.

In some embodiment, the processor may tune the portion of total iterations in which the individual or group of synapse or filters are activated. In various embodiment, the tuned portion is a fixed number, dynamically adjusted to keep error below threshold, dynamically adjusted inversely proportionally to error, dynamically adjusted to keep total computations below threshold, dynamically adjusted to asymptotically decrease and increase as the prediction results converge or diverge in multiple iterations of prediction or as the error converges to or diverges from zero during training, respectively, dynamically adjusted based on monitored real-time availability of hardware resources, etc.

The processor may perform a hybrid combination of partially-activating and fully-activating the neural network. The neural network may be partially or fully activated for different layers, filters, channels, iterations, or modes of operation, of the neural network. In come embodiments, the processor may alternate between partially-activating and fully-activating the neural network periodically, according to a predetermined schedule, and/or when a measure of error or accuracy crosses a threshold. In some embodiments, the processor may partially-activate the neural network only in training mode and fully-activate the neural network only in prediction mode, or may partially-activate the neural network only in prediction mode and fully-activate the neural network only in training mode, or may partially-activate the neural network in both training mode and prediction mode.

In some embodiments, when an individual or group of synapses or filters are inactive for a greater than threshold time or number of iterations, the synapses or filters may be reactivated (to reintroduce the synapses or filters test if any changes made during training now render those neuron/synapse significant). In some embodiments, when an individual or group of synapses or filters are inactive for a greater than threshold time or number of iterations or have below threshold historical metrics of activity, the synapses or filters may be permanently deactivated, deleted or pruned. Pruning a substantial proportion of the neural network's synapses or filters (e.g., at least 50%-99%) may generate a sparse neural network. This sparse neural networks may be used to increase the speed and reduce memory usage of the neural network, e.g., as disclosed in U.S. Pat. No. 10,366,322 issued on Jul. 30, 2019, which is incorporated herein by reference in its entirety.

In operation 530, a processor may perform training or prediction of the neural network based on the plurality of partial activations of the neural network.

During training, the processor may perform a plurality of backward pass error correction iterations, in which each individual or group of synapses or filters is corrected in the portion of the total number of error correction iterations. Training may be performed by backpropagation, evolutionary modeling (e.g., as disclosed in U.S. Pat. No. 10,339,450 issued on Jul. 2, 2019, incorporated herein by reference in its entirety), or any other error correction or training method.

During prediction, the processor may perform a plurality of forward pass inference iterations to generate a plurality of partial outputs, respectively. Each individual or group of synapses or filters may be computed in the portion of the total number of inference iterations. The plurality of partial outputs may be aggregated to generate an aggregated output approximating an output generated by fully-activating the neural network as if a single instance of all synapses or filters were executing for the neural network. The synapses or filters activated in the plurality of inference iterations may cumulatively span only a subset of all the synapses or filters of the neural network such that a plurality of the remaining synapses or filters are not activated.

In some embodiments, the activated subset of the plurality of synapses or filters may be selected based on an input into the neural network. For example, the input may be analyzed to determine an optimal activation subset, for example, based on lookup table or a second neural network trained to correlate inputs with optimal partial activation patterns. Activation in each layer may be based on the input layer, a single preceding layer and/or an accumulation of all or any combination of previous layers.

Other operations or orders of operations may be used. In some embodiments, various operations may be combined, performed in parallel or in sequence, or otherwise permuted. For example, iteratively executing a plurality of partial activation iterations (operation 520) may be considered part of training or predicting the neural network (operation 530).

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include a hierarchy of partial pathways. For example, in the case of classifying neural networks, an initial set of partial pathways may be used that are the best performing pathways for predicting a highest-level super-class classification. Once the highest-level classification is predicted, a subsequent set of partial pathways may be used that are the best performing pathways for predicting a next highest-level classification between the classes in this specific super-class. The process may iterate with a new optimized set of partial pathways for each classification level in the hierarchy. These sets of partial pathways can be created by running multiple experiments on training data and selecting the best performing sets of pathways for each classification. They can also be manually chosen, or a combination of both approaches.

Embodiments of the invention may include normalizing the output of a layer, to compensate for the reduced signal from that layer, when only part of the output layer is activated in a specific partial pathway forward. In some embodiments, values may be normalized per neuron, per layer, per entire pathway, or any combination thereof.

Embodiments of the invention may include an implementation where the first set of layers execute using all of the neurons in those layers, then the result from the last such layer can be saved and used as input to all of the partial pathway runs of the rest of the network.

Embodiments of the invention may include an article such as a non-transitory computer or processor readable medium, or a computer or processor non-transitory storage medium, such as for example a memory (e.g., memory unit(s) 416 and/or 426 of FIG. 4), a disk drive, or a USB flash memory, encoding, including or storing instructions, e.g., computer-executable instructions, which, when executed by a processor or controller (e.g., processor(s) 414 and/or 424 of FIG. 4), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for training or prediction of a neural network, the method comprising:
storing a current value of each of a plurality of synapses or filters in a neural network;
generating a heat map comprising a historical metric of activity for each individual or group of one or more of the synapses or filters during one or more past iterations;
iteratively executing a plurality of partial activations of the neural network, wherein each partial-activation iteration activates a subset of the plurality of synapses or filters in the neural network based on the heat map of historical metrics of activity of the synapses or filters, wherein the synapses or filters in hot spots of the heat map that were activated with relatively high weights or frequencies during the one or more past iterations are activated more often in the partial-activation iterations than synapses or filters activated in cold spots of the heat map that were activated with relatively low weights or frequencies during the one or more past iterations; and
performing training or prediction of the neural network based on the plurality of partial activations of the neural network.

2. The method of claim 1, wherein the historical metric of activity is selected from the group consisting of: a frequency that each individual or group of synapses or filters was activated in one or more past iterations, a magnitude of the synapse or filter weights in one or more past iterations, a magnitude of a change in the synapse or filter weights in one or more past error correction iterations, an average median or standard deviation of any of those measures, and a value derived from any individual or combination thereof.

3. The method of claim 1 comprising dynamically updating the historical metrics of activity periodically or each iteration or time an individual or group of synapses or filters is activated.

4. The method of claim 3 comprising displaying a moving image of the heat map comprising a sequence of frames visualizing the dynamically updated historical metrics of activity over a sequence of one or more respective iterations.

5. The method of claim 1 comprising, during training, performing a plurality of backward pass error correction iterations to correct each individual or group of activated synapses or filters.

6. The method of claim 1 comprising, during training or prediction:
performing a plurality of forward pass inference iterations to generate a plurality of partial outputs, respectively, in which each individual or group of synapses or filters is computed in the portion of the total number of inference iterations; and
aggregating the plurality of partial outputs to generate an aggregated output approximating an output generated by fully-activating the neural network by executing a single instance of all synapses or filters of the neural network.

7. The method of claim 6, wherein the synapses or filters activated in the plurality of inference iterations cumulatively span only a subset of all the synapses or filters of the neural network such that a plurality of the remaining synapses or filters are not activated.

8. The method of claim 1 comprising determining the subset of the plurality of synapses or filters to activate based on an input into the neural network.

9. The method of claim 1, wherein synapses or filters are activated in discrete groups selected from the groups consisting of: sequences of synapses or filters forming neural network pathways linking a continuous sequence of synapses or filters from an input layer to an output layer, groups of synapses each directly connected to a neuron, and groups of filters each directly connected to a group of neurons in a convolutional neural network.

10. The method of claim 1 comprising performing a hybrid combination of partially-activating and fully-activating the neural network for different iterations, layers, filters, channels, or modes of operation.

11. The method of claim 10 comprising alternating between partially-activating and fully-activating the neural network according to a predetermined schedule.

12. The method of claim 10 comprising switching between partially-activating and fully-activating the neural network when a measure of error or accuracy crosses a threshold.

13. The method of claim 1 comprising reactivating an individual or group of synapses or filters that are inactive for a greater than threshold time or number of iterations.

14. The method of claim 1 comprising initiating training or prediction by fully activating all synapses or filters of the neural network and incrementally deactivating individual or groups of synapses or filters with below threshold historical metrics of activity.

15. The method of claim 1 comprising initiating training or prediction by partially activating a random or semi-random subset of synapses or filters of the neural network and activating additional synapses or filters with above threshold historical metrics of activity and deactivating synapses or filters with below threshold historical metrics of activity.

16. The method of claim 1 comprising generating a sparse neural network by pruning or eliminating synapses or filters with below threshold historical metrics of activity or above threshold numbers of deactivated iterations.

17. The method of claim 1 comprising tuning the portion of total iterations in which the individual or group of synapse or filters are activated.

18. The method of claim 1 comprising:
partially activating the neural network only during training and fully-activating the neural network only during prediction,
partially activating the neural network only during prediction and fully-activating the neural network only during training mode, or
partially activating the neural network during both training and prediction.

19. A system for training or prediction of a neural network, the system comprising:
one or more memories to store a current value of each of a plurality of synapses or filters in the neural network;
one or more processors configured to:
generate a heat map comprising a historical metric of activity for each individual or group of one or more of the synapses or filters during one or more past iterations,
iteratively execute a plurality of partial activations of the neural network, wherein each partial-activation iteration activates a subset of the plurality of synapses or filters in the neural network based on the heat map of historical metrics of activity of the synapses or filters, wherein the synapses or filters in hot spots of the heat map that were activated with relatively high weights or frequencies during the one or more past iterations are activated more often in the partial-activation iterations than synapses or filters activated in cold spots of the heat map that were activated with relatively low weights or frequencies during the one or more past iterations, and train or predict using the neural network based on the plurality of partial activations of the neural network.

20. The system of claim 19, wherein the historical metric of activity is selected from the group consisting of: a frequency that each individual or group of synapses or filters was activated in one or more past iterations, a magnitude of the synapse or filter weights in one or more past iterations, a magnitude of a change in the synapse or filter weights in one or more past error correction iterations, an average median or standard deviation of any of those measures, and a value derived from any individual or combination thereof.

21. The system of claim 19, wherein the one or more processors are configured to dynamically update the historical metrics of activity periodically or each iteration or time an individual or group of synapses or filters is activated.

22. The system of claim 19, wherein the one or more processors are configured to visualize, on a display device, a moving image of the heat map comprising a sequence of frames showing the dynamically updated historical metrics of activity over a sequence of one or more respective iterations.

23. The system of claim 19, wherein the one or more processors are configured to, during training, perform a plurality of backward pass error correction iterations to correct each individual or group of activated synapses or filters.

24. The system of claim 19, wherein the one or more processors are configured to, during training or prediction:

perform a plurality of forward pass inference iterations to generate a plurality of partial outputs, respectively, based on computations of each individual or group of activated synapses or filters, and aggregate the plurality of partial outputs to generate an aggregated output approximating an output generated by fully-activating the neural network by executing a single instance of all synapses or filters of the neural network.

25. The system of claim 19, wherein the one or more processors are configured to determine the subset of the plurality of synapses or filters to activate based on an input into the neural network.

26. The system of claim 19, wherein the one or more processors are configured to activate the synapses or filters in discrete groups selected from the groups consisting of: sequences of synapses or filters forming neural network pathways linking a continuous sequence of synapses or filters from an input layer to an output layer, groups of synapses each directly connected to a neuron, and groups of filters each directly connected to a group of neurons in a convolutional neural network.

27. The system of claim 19, wherein the one or more processors are configured to perform a hybrid combination of partially-activating and fully-activating the neural network for different iterations, layers, filters, channels, or modes of operation.

28. The system of claim 19, wherein the one or more processors are configured to generate a sparse neural network by pruning or eliminating synapses or filters with below threshold historical metrics of activity or above threshold numbers of deactivated iterations.

29. The system of claim 19, wherein the one or more processors are configured to tune the portion of total iterations in which the individual or group of synapse or filters are activated.

30. The system of claim 19, wherein the one or more processors are configured to:

partially-activate the neural network only during training and fully-activate the neural network only during prediction, partially-activate the neural network only during prediction and fully-activate the neural network only during training mode, or partially-activate the neural network during both training and prediction.

* * * * *